Nov. 16, 1954     C. WALDEYER     2,694,336
MOTION-PICTURE COMBINATION

Filed Jan. 25, 1949     3 Sheets-Sheet 1

INVENTOR.
Carl Waldeyer

Nov. 16, 1954
C. WALDEYER
2,694,336
MOTION-PICTURE COMBINATION
Filed Jan. 25, 1949
3 Sheets-Sheet 2
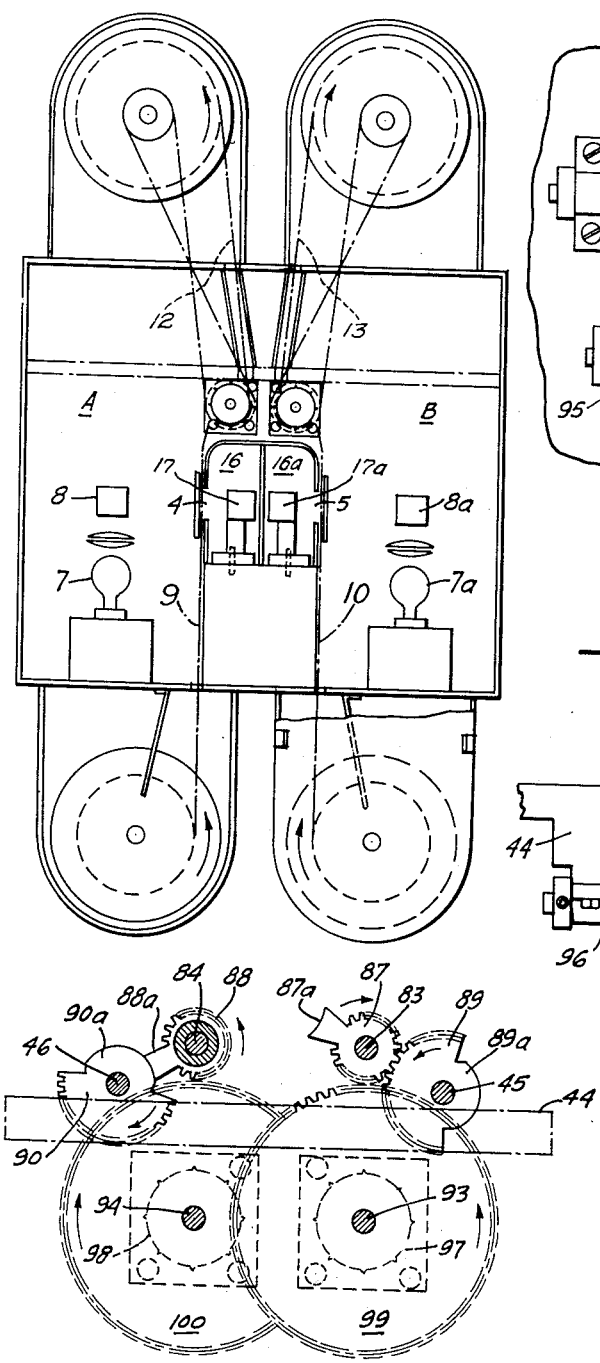
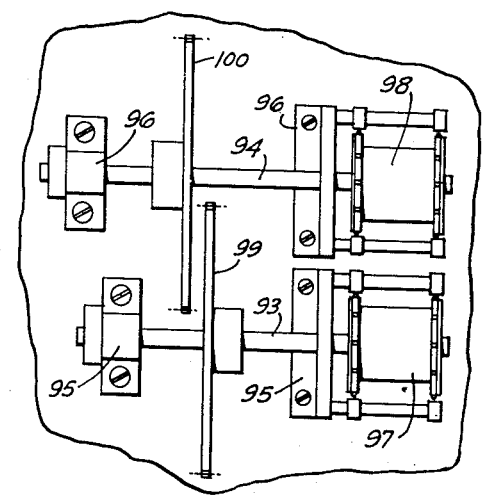
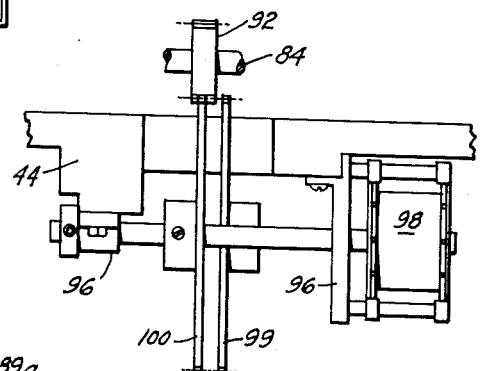
INVENTOR.
Carl Waldeyer Nov. 16, 1954  C. WALDEYER  2,694,336
MOTION-PICTURE COMBINATION
Filed Jan. 25, 1949  3 Sheets-Sheet 3

INVENTOR.
Carl Waldeyer

United States Patent Office 2,694,336
Patented Nov. 16, 1954

2,694,336

MOTION-PICTURE COMBINATION

Carl Waldeyer, San Francisco, Calif.

Application January 25, 1949, Serial No. 72,561

2 Claims. (Cl. 88—16.6)

My invention relates to a motion picture projection device.

An object of the invention is to provide a motion picture projector adapted to project films, after processing, in the manner and at the speeds provided by the camera and projector of my patent, Serial No. 553,629, filed September 11, 1944, now Patent 2,460,320, of February 1, 1949, to which patent reference is hereby made.

An object of my invention is to provide a motion picture projector similar in some respects to the projector of the patent, but with a substantial reduction in mechanism and actuating parts, and the addition of novel features.

A further object is to provide a motion picture projector adapted to operate without shutters of any kind disposed within the casing of the device, this innovation made possible by the introduction of duplicate dark chambers within the device.

This invention is a continuation in part of my patent, Serial No. 553,629, filed September 11, 1944, now Patent 2,460,320, issued February 1, 1949.

Other objects of my invention will be specifically pointed out in the description and drawing forming part of this specification, but I do not limit myself to the embodiment of the invention described herein, as various forms may be adopted within the scope of the claims following the description.

My invention may be more fully understood by direct reference to the drawing.

In the three sheets of drawing:

Fig. 2 illustrates a wedge prism which is sometimes used by those skilled in the art, in devices of this nature;

Fig. 3 is a section on line 3—3 of Fig. 1, and should be considered in connection with Figs. 7 and 8;

Fig. 4 shows an elevation illustrating general arrangement of parts of a motion picture combination constructed in accordance with this invention;

Figs. 7 and 8 illustrate the conventional type of film actuating means.

Figure 1:
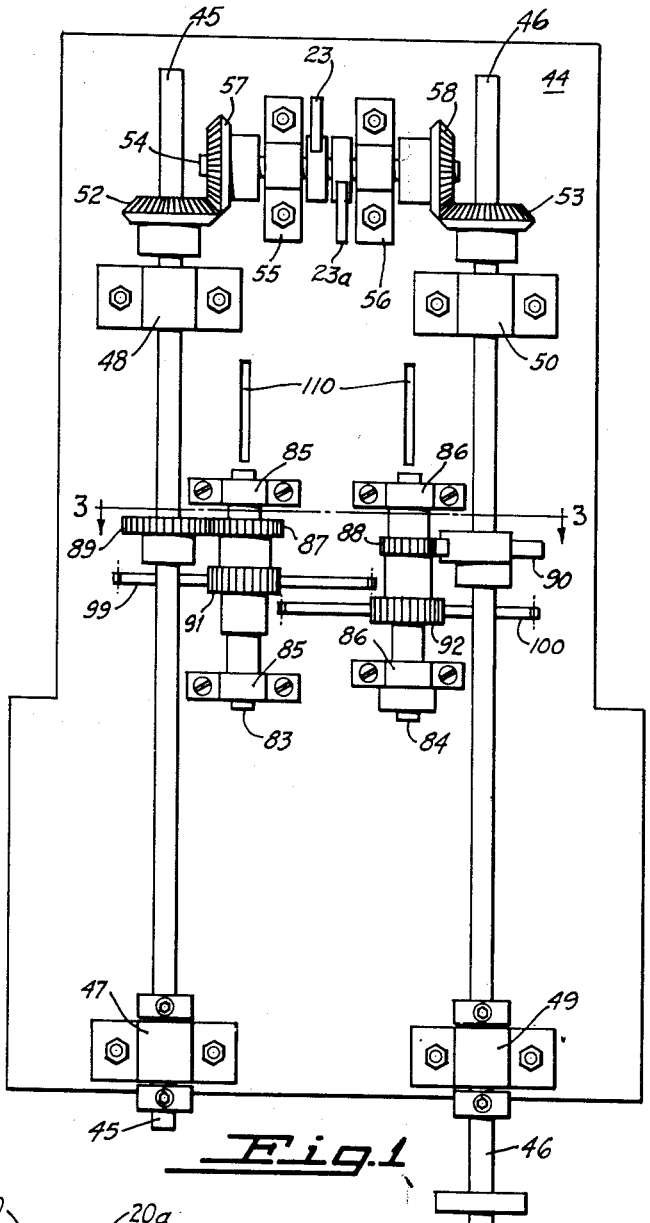
Fig. 1 is a top or plan view of the actuating mechanism of the invention, shown mounted on top of the casing of the device.
Figure 10:
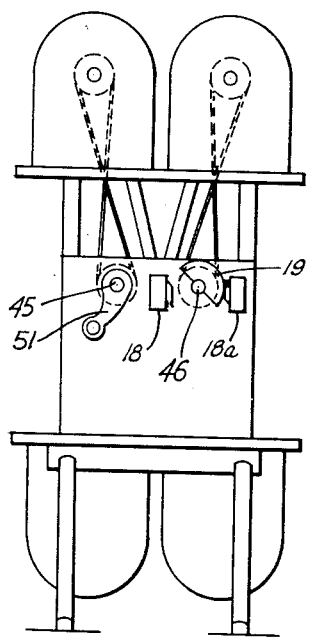
Figure 6:
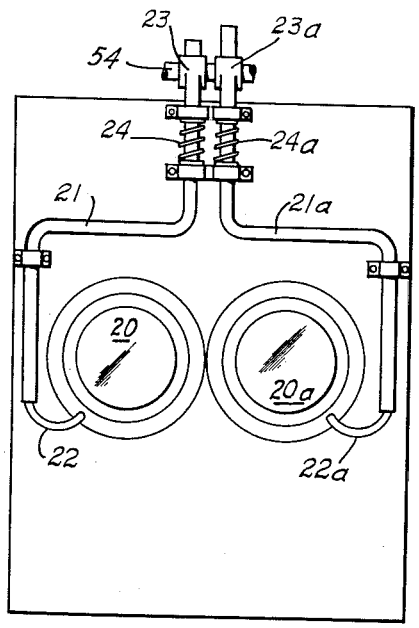
Fig. 6 illustrates a device used principally in connection with camera action, and is not used in the present invention.
Figure 11:
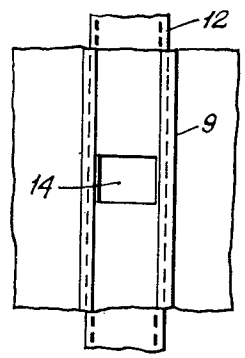

Fig. 10 also shows the feature of having electric switches installed on the rear of the casing, and also an operating cam;

Fig. 11 is a side elevational view of one of the film guides;

Fig. 1 illustrates the mechanism disposed on top of casing cover 44, and Figs. 3, 7 and 8 are illustrated as disposed below the casing cover.

An examination of the mechanism disclosed in these respective figures, and also the description of same, forming part of the specification, shows that the various mechanisms are employed solely and only in promoting the movement, in the known way, of the respective duplicate films.

This restriction to the use of all mechanisms shown within the casing, and top of same, is made possible due to the installation, within the casing, of duplicate dark chambers 16 and 16a, which eliminates the necessity of employing shutters of any kind within the device, and, obviously, mechanism to operate same.

Fig. 4 shows an elevation from the rear, looking forward, and illustrates all the principal features of the invention, exclusive of the objectives and the actuating mechanism.

Attention is called to the lamp house assemblies, disposed, respectively, in lamp houses A and B, Fig. 4.

In the patent, cited and listed as Waldeyer of record, it is noted that, in the projector of the patent, the light bulbs in the respective lamp houses are disposed in the conventional manner, adapting the light and heat of the bulbs to shine directly on the respective exposure-positioned films.

The specification and claims of the patent require that the films move not faster than approximately four frames per second, instead of a speed of approximately sixteen frames per second, as required in the conventional type of projector.

This condition requires that the projector use only very low wattage bulbs in the respective lamp houses, to prevent damage by heat to the slow moving films, in the patent device.

The projector of the patent can be considered, therefore, as only a parlor toy, with the requirement that the projector be positioned very close to the screen, so that the moving images on the screen be not too dim, as will be understood by those skilled in the art.

The drawing, as well as the specification of the application, shows an entirely different arrangement of the light bulbs in lamp houses A and B. The light bulbs 7 and 7a are so disposed that light and heat are not adapted to shine directly on the exposure-positioned film, in the manner indicated in the patent device.

In lamp housings A and B the conditions of operation are alike, with the same reference numbers in lamp housing B distinguished by the addition of the letter a.

In lamp housing A light bulb 7 is indicated as adapted to project concentrated light and heat, by the medium of the known kind of condensing lenses, to a mirror or prism 8, set at right angles to the axis of the light beam shining from light bulb 7.

The light is then transversely projected, by mirror 8, through projection aperture 4, to right angle prism 17, disposed in dark chamber 16. See Figs. 4 and 5.

Figure 5:
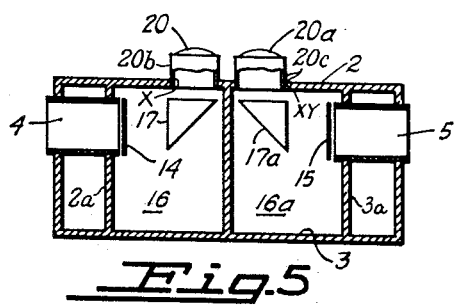
Fig. 5 illustrates the general arrangement of the casing of the device.

The drawing, Figs. 4 and 5, indicates that prisms 17 and 17a are not disposed on any adjustable mounts that will adapt them to be focused at any distance desired.

In constructing a projector, as delineated in the drawing, and outlined in the description of this application, the skilled workman, or one skilled in the art will, after establishing a predetermined projection distance between projector and screen, adjust and integrally set prisms 17 and 17a to operate at the desired fixed focus.

Figure 9:
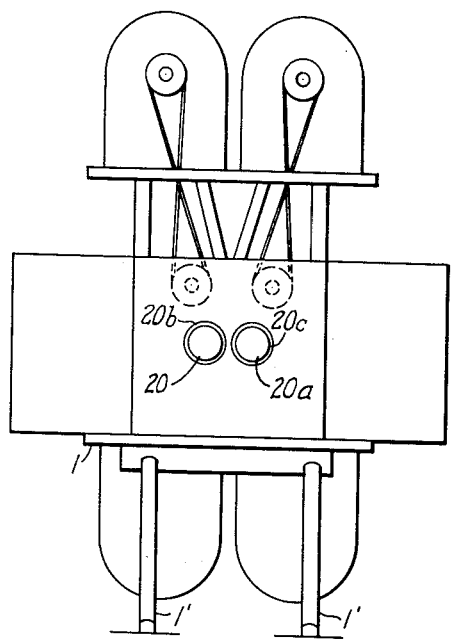
Figs. 9 and 10 are illustrations of a front and rear view of the device ready for action.

In the same manner objectives 20 and 20a, Figs. 5 and 9, not being equipped with adjustable focusing apparatus, will be adjusted, set and fixed, by the skilled workman, to establish proper coaction with the fixed focal arrangements of prisms 17 and 17a.

It will be apparent, from the above description of the actuating mechanism focalizing arrangements and duplicate dark chambers of the projector described herein, that the device is to be constructed on the simplest and least complicated plans possible.

Light from mirror 8, transversely projected through projection aperture 4 to prism 17, disposed in dark chamber 16, will then be transversely projected, again, from prism 17, through objective 20, to a screen.

When the light in light bulb 7, in lamp housing A, is extinguished and light bulb 7a, in lamp house B is illuminated, the light is projected through objective 20a, to the same focal point on the screen as is occupied when the light comes from objective 20.

Figs. 9 and 10 are illustrations of the front and rear view, respectively, of the projection device when ready for projection.

Fig. 9 shows the duplicate objectives 20 and 20a adjustably fixed, as explained above, to focus at a given point on a screen, or projection surface.

On Fig. 10 there is illustrated the actuating crank handle 51, disposed on the rear end of driving shaft 45.

Fig. 10 also shows the electric switches 18 and 18a, disposed on the rear wall of the casing, on opposed sides of companion driving shaft 46.

The rear end of driving shaft 46 is shown to have fixed thereon a cam 19, adapted to alternately contact and electrify, respectively, switches 18 and 18a.

Fig. 11 is a side elevational view of one of the film guides 9 which are a part of the inner side walls, respectively, of the device. The parallel side walls of the casing are thus provided with covered guideways 9 and 10, adapted to lead the respective films 12 and 13 through the focal plane and adapted to exclude light from the said films except at exposure openings 14 and 15. In the projector exposure openings 14 and 15 are, in effect, extensions of projection apertures 4 and 5. See Figs. 4, 5 and 11.

It can be noted that the invention provides duplicate dark chambers 16 and 16a at the exposure openings 14 and 15, Fig. 5, and this arrangement makes it unnecessary to employ shutters of any description within the respective dark chambers 16 and 16a, as the flash from a lighted bulb, to an exposure positioned film, in its dark chamber, does not affect the companion film within its separate, and momentarily darkened, chamber.

Projection apertures 4 and 5, Figs. 4 and 5, are disposed in the respective side walls of the casing, positioned so as to be in axial alinement with the transversely projected light beams from the respective lamp housings A and B, and the respective prisms 17 and 17a, within their respective dark chambers 16 and 16a. The light will then be transversely projected, in alternate sequence, from prisms 17 and 17a, through the respective objectives 20 and 29a, to a focal area on a screen.

The respective light bulbs 7 and 7a, in their lamp housings, A and B, are adapted to be alternately illuminated and darkened so that the illuminated bulb projects light through the exposure-positioned film while the companion bulb remains dark until the companion film arrives in exposure position, when the first light is instantaneously darkened and the companion bulb is as instantaneously illuminated. It can be seen that this arrangement provides for a constant light on the screen, and, obviously, eliminates the period of darkness which is an important part of the conventional method of projection.

The only actuating means within the casing of the device, provided for actuating the duplicate films 12 and 13, Fig. 4, is best shown in Figs. 1, 3, 7 and 8.

Parallel driving shafts 45 and 46 are disposed in lengthwise positions on the casing top 44, and rotatably mounted in bearings 47—48 and 49—50 on top of the said casing.

The left hand member 45 of the said duplicate shafts is provided with a manually operated crank 51, fixed to the rear end of said shaft. Fig. 10. Shaft 43 may also be operated by any suitable power means.

Miter gears 52 and 53 of identical ratio are fixed to the contiguous front ends of said parallel driving shafts.

A cross shaft 54 similarly revolves in bearings 55—56 on said casing top and extends between the said parallel shafts 45—46 at the front ends thereof. Miter gears 57—58 of like ratio to said gears 52—53 are fixed on the respective ends of said cross shaft 54, and are engaged, respectively, with the respective miter gears 52—53 disposed on the ends of the said parallel shafts 45—46. Fig. 1.

The connection between the said parallel shafts 45—46 by the medium of the said cross shaft 54 and the miter gears 52—53 and 57—58 is so arranged that when the crank operated shaft 45 is revolved in a clockwise direction the companion shaft 46, revolves counterclockwise. Fig. 1. Countershafts 83 and 84, respectively, are revolvably disposed in bearings 85—85 and 86—86 fixed on top of casing 44, in positions parallel to the duplicate drive shafts 45—46. Mutilated pinions 87 and 88 are fixed on the respective countershafts 83 and 84, said pinions engaging cooperating mutilated drive gears 89 and 90, respectively, fixed on the said parallel drive shafts 45 and 46. Fig. 1 and Fig. 3. These countershafts 83 and 84 are adapted, respectively, to be alternately driven by the said mutilated gears 89 and 90, upon the revolution of the respective drive shafts 45 and 46.

Said countershafts 83 and 84, respectively, have also fixed thereon pinions 91 and 92 for purposes hereinafter explained. See Figs. 1 and 7.

Countershafts 93 and 94 revolvably set in bearings 95—95 and 96—96, are disposed on the underside of the casing cover 44, substantially in vertical alinement with shafts 83 and 84 on top of said casing. These respective countershafts 93 and 94 have fixed thereon film feed barrels 97 and 98, each barrel provided with sprocket teeth. Said sprocket toothed barrels are provided, respectively, with rollers which are adapted to hold the respective films 14 and 15 in engagement with the sprocket teeth on the respective film feed barrels 97 and 98. See Figs. 3 and 4. Also Figs. 7 and 8.

The respective sprocket barrel shafts 93 and 94 have fixed thereon driven gear 99 and 100, respectively. Said gear being adapted to engage, through openings provided in casing top 44, the driving pinions 91 and 92 fixed, respectively, on countershafts 83 and 84 mounted on top of said casing. Figs. 1 and 3. This arrangement adapts said countershafts 93 and 94, respectively, to have mutilated gear connections with the driving shafts 45 and 46, whereby an alternate and intermittent motion is transmitted to the said respective sprocket barrel shafts.

Fig. 4 illustrates the manner in which films 12 and 13 are threaded through the device.

In reel housings disposed below the casing film feed reels are disclosed, engaging studpins of the conventional kind, and having wound on them the respective films 12 and 13. The films are wound with their emulsions facing each other, and are adapted to move upwardly as indicated by arrows. They are adapted to move upwardly, from lower feed reels to upper take-up reels, in a rigid, approximately straight line, except for the necessary deviation to be partly wound around the respective sprocket barrel shafts, as shown in Fig. 4.

The respective films 12 and 13 are adapted to enter the film feed guides 9 and 10 through the respective roofs of the lower film feed housings. The actuating gear, as described above, see Figs. 1, 3, 7 and 8, causes the respective films to alternately assume their exposure positions before projection apertures 4 and 5, respectively. See Figs. 4 and 5.

Due to the comparatively slow motion of the respective films conventional looping of the films is not required.

The finger like device commonly used in the conventional, single film projector for moving the film one frame at a time, into projection position, is not used in the projector of the application; the teeth on the respective sprocket barrels 97 and 98 are adapted to supply this function by engaging the perforations on the respective, rigidly set, films 12 and 13. Fig. 3.

Pulleys are disposed on extensions of the respective sprocket barrel shafts, 93 and 94, and on extensions of the stud pins of the respective upper reel housings.

Crossed elastic belts are adapted to engage the upper and lower pulleys. The revolution of the upper take up reels, tends to equalize the tension exerted on the film perforations by the pull of the sprocket teeth. Figs. 4, 9 and 10.

Fig. 10 shows how duplicate electric switches, 18 and 18a, are disposed on the rear wall of the device, positioned on opposed sides of shaft 46. A cam 19 is shown to be fixed on an extension of duplicate drive shaft 46, and is positioned, in relation to the respective switches 18 and 18a, so that a full revolution of shaft 46 causes the said cam to alternately electrify the said switches.

Electric current from a source of power is provided in the known manner, and a conventional circuit is established, in the known manner, extending from the source of power, through the respective switches, and back to the source of power.

Light bulbs 7 and 7a, situated in lamp houses A and B, Fig. 4, are, in the known manner, adapted to be included on the said electric circuit.

It is the cam 19, see Fig. 10, as adapted to be disposed on an extension of driving rod 46, which forms a connection, or coaction, between the mechanical means described in the specification for actuating the device, and the electric circuit which, through the medium of the said cam, is adapted to alternately illuminate the said bulbs 7 and 7a.

In describing the manner in which the films 12 and 13 are adapted to assume, respectively, their exposure positions, it is stated, above, as follows:

"The respective films 12 and 13 are adapted to enter their film feed guides 9 and 10 through the respective roofs of the lower film feed housings. The actuating gear, as described above, see Figs. 1, 3, 7 and 8, causes the respective films to alternately assume their exposure positions before projection apertures 4 and 5, respectively. See Figs. 4 and 5."

The cam 19, properly adjusted on an extension of companion drive shaft 46, forms an accurate and exact coacting medium between the mechanical means adapted to actuate the respective films, and the electrical means adapted to illuminate the respective light bulbs 7 and 7a.

The coaction of the different elements to produce the results claimed herein can be best described as follows:

Electric current, from a source of power, is conveyed in the known manner to the electric switches 18 and 18a, shown, in Fig. 10, to be fixed on opposed sides of driving shaft 46.

Lamp bulbs 7 and 7a are fixed, respectively, in lamp houses A and B, Fig. 4, and electric contact is adapted to be made, in the known manner, between the respective switches 18 and 18a, and the respective light bulbs 7 and 7a.

A cam 19 is adjustably set, in the known manner, on an extension of driving shaft 46, which shaft, as described, is adapted to revolve in an anti-clockwise direction. A half revolution of shaft 46 will cause cam 19, when properly set, to energize switch 18, and also light bulb 7. On completion of this half revolution of shaft 46, cam 19 will instantaneously release contact with switch 18, and lamp bulb 7 will be immediately darkened; cam 19 upon release of contact with switch 18 will, in the same manner, immediately make contact with switch 18a, and lamp bulb 7a will be illuminated for the next half-turn of rod 46.

When driving shaft 46 is revolving, and actuating cam 19, it is an indication that the entire mechanism adapted to actuate the respective films 12 and 13, as described above, is in operation.

At the end of a half revolution of crank handle 51, the picture on frame 1, of film 12, is adapted, by proper adjustment, to be brought into exposure position, and at rest, before projection aperture 4, Fig. 4. Frame 1 will remain in its exposure position during the next half revolution of crank handle 51.

At the moment frame 1, on film 12, is brought into exposure position before projection aperture 4, cam 19, disposed on driving rod 46, will be properly adjusted, in the known manner, so that the continued travel of crank handle 51, for the next half revolution will, in the coaction between them, electrify switch 18, and light bulb 7.

The coaction between light bulb 7 and mirror 8, both integrally set in lamp housing A, will cause the light from lamp 7 to be transversely projected through projection aperture 4, and through film 12, and in further coaction the image of the picture on exposure positioned frame 1, on film 12, will be transversely projected by prism 17, in dark chamber 16, through objective 20, to a focal point on a screen.

The travel of crank 51, on its second half revolution, will cause cam 19 to electrify switch 18a and light bulb 17a, and a similar coaction of elements will cause the image of picture No. 2, on frame 1, of film 13, to be, in like manner projected to the same focal point on the screen previously held by the image of picture No. 1, from film 12.

No other adjustment is necessary during the projection period.

For operating the projector the films 12 and 13 are threaded into the device, as described, and properly adjusted.

Wires, in the known manner, are run from lamp bulbs 7 and 7a, respectively, through switches 18 and 18a, to a source of power.

The turning of crank handle 51 will then, as described, properly project the images of pictures on films 12 and 13, to a focal point on a screen, thereby causing the illusion of motion.

While the image of the picture on film 12 remains on the screen during the full half-revolution of crank 51, the succeeding picture, on film 13, is being brought into exposure position, shrouded in the darkness of dark chamber 16a.

When crank handle 51 starts on its second half-revolution light from bulb 7 is immediately extinguished, and dark chamber 16a is instantaneously illuminated by the light from light bulb 7a. In the same manner as occurs in conventional projection, the after-image of the extinguished image, in film 12, remains in the eye of the observer for a short period of time before a fusion is made with the image of the succeeding picture projected from film 13. This is the only similarity between the conventional projector and the projector of the application.

The substitution of a constant light on the screen and the elimination of the period of darkness produces a result in projection entirely different to that produced by the conventional projector. This result is fully explained in the specification of the patent, of which this application is a continuation in part.

When a new image is projected on the screen, the image is not seen, by the eyes of the observer, for the full half revolution time consumed in projection. The actual time the new image is seen by the observer consists of the full half-revolution time less the time the after-image of the previous picture remains in the eye. It is this reduction, in coaction with the innovation of a constant light on the screen and the elimination of the period of darkness, which not only permits but requires a slower projection speed than is permitted in conventional practice.

Having described my invention, as above, what I claim as new and desire to secure by Letters Patent is:

1. In a moving picture projection device the combination with a plurality of alternately and intermittently moving films, means to actuate said films and means to adapt said films to alternately assume exposure positions within the device comprising a moving picture projection combination having a bed, a closed casing, means, including a plurality of dark chambers within said casing, to adapt the device to operate without shutters, paired, integrally set lens tubes equipped with duplicate lenses inserted therein, paired right angle prisms integrally set within said respective dark chambers and positioned within the focal plane of the respective lens assemblies and the respective projection apertures and means to project light, alternately, from said exposure-positioned films through said right angle prisms located within said duplicate dark chambers to said duplicate lenses and through said lenses to a focal point on a screen; projection apertures disposed in the respective side walls of said casing in axial alinement, respectively, with said respective prisms within said dark chambers and the light means within the respective lamp housings: film channel guides disposed on said respective side walls of the casing adapted to exclude light from the films except at exposure openings positioned in axial alinement with said projection apertures; lamp houses disposed on the respective side walls of the casing with light means therein, right angle prisms integrally fixed within the respective lamp housings and adapted to be in axial alinement with the respective light means and the respective projection apertures; means to transversely project light from the respective lamp houses, through said right angle prisms and through said projection apertures and said exposure-positioned films to said right angle prisms located within the duplicate dark chambers and means to project light through said dark chamber prisms transversely to said duplicate lenses, and through said lenses to a focal point on a screen whereby the images of pictures on the said exposure-positioned films are alternately projected on a screen with the illusion of motion.

2. In a moving picture projection device the combination with a plurality of alternately and intermittently moving films, means to actuate said films and means to adapt said films to alternately assume exposure positions within the device comprising a moving picture projection combination having a bed, a closed casing, means, including a plurality of dark chambers within said casing, to adapt the device to operate without shutters, paired, integrally set lens tubes equipped with duplicate lenses inserted therein, paired right angle prisms integrally set within said respective dark chambers and positioned within the focal plane of the respective lens assemblies and the respective projection apertures and means to project light, alternately, from said exposure-positioned films through said right angle prisms located within said duplicate dark chambers to said duplicate lenses and through said lenses to a focal point on a screen; projection apertures disposed in the respective side walls of the casing in axial alinement, respectively, with the prisms within said dark chambers and the light projected from the respective lamp houses; film channel guides disposed on said respective side walls of said casing adapted to exclude light from said films except at exposure openings positioned in axial alinement with said projection apertures; lamp housings disposed on the respective side walls of said casing with light means therein, right angle prisms integrally fixed within the respective lamp housings and adapted to be in axial alinement with the respective light means and the respective projection apertures, means to transversely project light from the respective lamp houses through the right angle lamp house prisms and through said projection apertures and said exposure-positioned films to said dark chamber prisms and transversely, from said prisms to said duplicate lenses and through said respective lenses to a focal point on a screen; electric switches disposed on the rear wall of the casing, means to electrify said switches and means to include the said lamp house bulbs in the electric circuit of said duplicate switches, a cam disposed on the driving rod of the device, means to adapt said cam to alternately make contact with, and electrify, said switches, means to adapt said switches to alternately illuminate and darken the respective lamp bulbs and means whereby the images of pictures on the said exposure-positioned films are adapted, in cooperation with the said duplicate dark chambers, to alternately project the images of pictures on a screen without the use of shutters, thereby producing the illusion of motion.

References Cited in the file of this patent

UNITED STATES PATENTS

| Number | Name | Date |
|---|---|---|
| 540,545 | Gray | June 4, 1895 |
| 1,247,646 | Craig | Nov. 27, 1917 |
| 1,461,133 | Marten | July 10, 1923 |
| 1,583,653 | Capstaff | May 4, 1926 |
| 1,909,222 | Pettie | May 16, 1933 |
| 1,923,987 | Luboshez | Aug. 22, 1933 |
| 1,936,114 | Luboshez | Nov. 21, 1933 |
| 1,952,519 | Transtrom | Mar. 27, 1934 |
| 1,973,822 | Mendez | Sept. 18, 1934 |
| 2,047,521 | Sassoli | July 14, 1936 |
| 2,053,689 | Barnes | Sept. 8, 1936 |
| 2,460,320 | Waldeyer | Feb. 1, 1949 |

FOREIGN PATENTS

| Number | Country | Date |
|---|---|---|
| 811,315 | France | Jan. 14, 1937 |